(12) United States Patent
Rashid

(10) Patent No.: US 11,278,386 B1
(45) Date of Patent: Mar. 22, 2022

(54) THREE-WAY MECHANICAL TOOTHBRUSH

(71) Applicant: Hamood M. Rashid, Cliffside Park, NJ (US)

(72) Inventor: Hamood M. Rashid, Cliffside Park, NJ (US)

(*) Notice: Subject to any disclaimer, the term of this patent is extended or adjusted under 35 U.S.C. 154(b) by 281 days.

(21) Appl. No.: 16/703,235

(22) Filed: Dec. 4, 2019

Related U.S. Application Data

(60) Provisional application No. 62/774,935, filed on Dec. 4, 2018.

(51) Int. Cl.
| | |
|---|---|
| *A61C 17/34* | (2006.01) |
| *A46B 9/04* | (2006.01) |
| *A46B 15/00* | (2006.01) |
| *A46B 13/02* | (2006.01) |
| *H01M 10/48* | (2006.01) |

(52) U.S. Cl.
CPC .......... *A61C 17/3472* (2013.01); *A46B 9/045* (2013.01); *A46B 15/0044* (2013.01); *A61C 17/3436* (2013.01); *A61C 17/3445* (2013.01); *A46B 13/02* (2013.01); *A46B 2200/1066* (2013.01); *A61C 2204/002* (2013.01); *H01M 10/488* (2013.01); *H01M 2220/30* (2013.01)

(58) Field of Classification Search
CPC . A61C 17/34; A61C 17/3445; A61C 17/3472; A61C 2204/002; A46B 9/045
USPC ....................................................... 15/167.2
See application file for complete search history.

(56) References Cited

U.S. PATENT DOCUMENTS

| | | | |
|---|---|---|---|
| 2,628,377 A | | 2/1953 | Cockriel |
| 3,934,298 A | | 1/1976 | Kim |
| 4,313,237 A | * | 2/1982 | Smith ............... A46B 9/045 15/23 |
| 4,538,315 A | | 9/1985 | Barth |
| 5,864,911 A | | 2/1999 | Arnoux et al. |
| 7,316,044 B1 | | 1/2008 | Nguyen et al. |
| 8,448,283 B2 | | 5/2013 | Caville et al. |
| 8,561,249 B1 | | 10/2013 | Malakova et al. |
| 8,584,292 B1 | | 11/2013 | Djang |

FOREIGN PATENT DOCUMENTS

| | | | | |
|---|---|---|---|---|
| CN | 106974739 A | * | 7/2017 | ........... A61C 17/222 |
| DE | 3435712 A1 | * | 4/1986 | ............. A61C 17/00 |

OTHER PUBLICATIONS

Computer generated English translation of DE3435712 A1 to Maser, Apr. 1986. (Year: 1986).*
Computer generated English translation of CN 106974739 A to Wu, Jul. 2017. (Year: 2017).*

* cited by examiner

*Primary Examiner* — Laura C Guidotti
(74) *Attorney, Agent, or Firm* — Cramer Patent & Design, PLLC; Aaron R. Cramer

(57) ABSTRACT

A three-way mechanical toothbrush includes an angular mechanical toothbrush having a plurality of switches and a charging port disposed on a first end and a toothbrush head disposed on a second end. The toothbrush head provides for three (3) discrete areas of brush bristles with each area capable of multiple directional brushing action.

20 Claims, 4 Drawing Sheets

THREE-WAY MECHANICAL TOOTHBRUSH

RELATED APPLICATIONS

The present invention is a continuation of and was first described in and claims the benefit of U.S. Provisional Application No. 62/774,935, filed Dec. 4, 2018, the entire disclosures of which are incorporated herein by reference.

FIELD OF THE INVENTION

The present invention relates generally to the field of toothbrushes and specifically to a mechanical toothbrush having three discrete areas of brush bristles.

BACKGROUND OF THE INVENTION

Everyone knows the importance of brushing his or her teeth to ensure complete dental care. One (1) tool that many use to help ensure proper dental care is the use of an electric toothbrush. Its rapid motion bristles ensure that proper cleaning is accomplished both above the gum line and below as well. However, the cleaning surface is one-dimensional only and only allows for one (1) surface of a tooth to be cleaned at one (1) time. This forces the user to take the proper time to clean each individual tooth surface. This means that those rushed for time or simply those not wishing to take the proper amount of time sacrifice their overall dental health by rushing the tooth brushing process.

Accordingly, there exists a need for a means by which the time needed to brush one's teeth with an electric toothbrush can be reduced. The use of the three-way mechanical toothbrush provides an effective and convenient alternative to conventional electric toothbrushes in a manner which is quick, easy, and effective.

SUMMARY OF THE INVENTION

The principles of the present invention provide for a toothbrush comprising a head having a center portion, a first side, and a second side. The toothbrush also comprises a generally linear elongated handle having a first distal end and a second distal end. The head extends away at an angle from the first distal end of the handle with a neck. The toothbrush also comprises a center brush having a plurality of bristles which are arranged in a circular pattern. The center brush is operably attached to a first drive mechanism within the head.

The toothbrush also comprises a battery compartment door which is located on a side of the handle midway between the first distal end and the second distal end, a first motor which is in mechanical communication to drive both the first side and the second side simultaneously, a second motor which is in mechanical communication to drive the center brush, a power switch which is located on the side of the handle and selectively provides or ceases power from the battery to the motors, an indicator light which is provided also on the side of the handle to provide illumination that indicates power of the battery, and/or activation of the first and second motors, a first motor driving a reciprocating wheel with a pivot bushing and a first lock block which provides an attachment for a first Bowden cable and a second Bowden cable. The Bowden cables pass through an interior of the neck and the head and the first side and the second side which are operably attached to the first and second Bowden cables within the head. The toothbrush also comprises a second motor driving a third Bowden cable along a rotational path that is transmitted to the center brush.

The center portion may be generally square in cross-sectional shape and the center brush may extend perpendicularly away from the center portion. The first side and the second side may each terminate at a greater distance than the center brush and may be mirror images of each other. In certain embodiments, the first side and second side each have a flexible element. The toothbrush may also comprise a plurality of first side bristles which extend perpendicularly away from an inner surface of the first side. The toothbrush may also comprise a plurality of second side bristles which extend perpendicularly away from an inner surface of the second side. In at least one (1) embodiment, the side bristles 21*b*, 22*b* have a length smaller than the length of the bristles of the center brush 25.

The generally linear elongated handle may be cylindrical and/or may be hollow. The second distal end of the handle may be a flattened portion with a hanging aperture to enable the toothbrush to be suspended from a support structure. The center brush may be motioned from the first side and the second side in a linear direction. The center brush may also rotate in a radial direction. The center brush may be electrically powered by an onboard set of batteries. The battery compartment door may removably cover a battery compartment that is configured to hold at least one battery.

The power switch may activate the motors to drive the center brush or the power switch may activate the motors to drive the first side or the second side. The power switch may also include a first activation of the power switch to activate the second motor to motion the center brush or the power switch may include a second activation of the power switch to activate the first motor to motion the first side and the second side simultaneously.

A reciprocating action of the reciprocating wheel may be transmitted along the first Bowden cable where a second lock block allows for movement of the first side along a reciprocating travel path while the second Bowden cable may provide for reciprocating action to the second side. The head may be sized such that a gap produced between the first side, the second side, and the center portion is large enough to accommodate at least a portion of a tooth of a user. The motors may operate the first side, the second side, and the center brush cleaning all areas of the tooth of the user.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
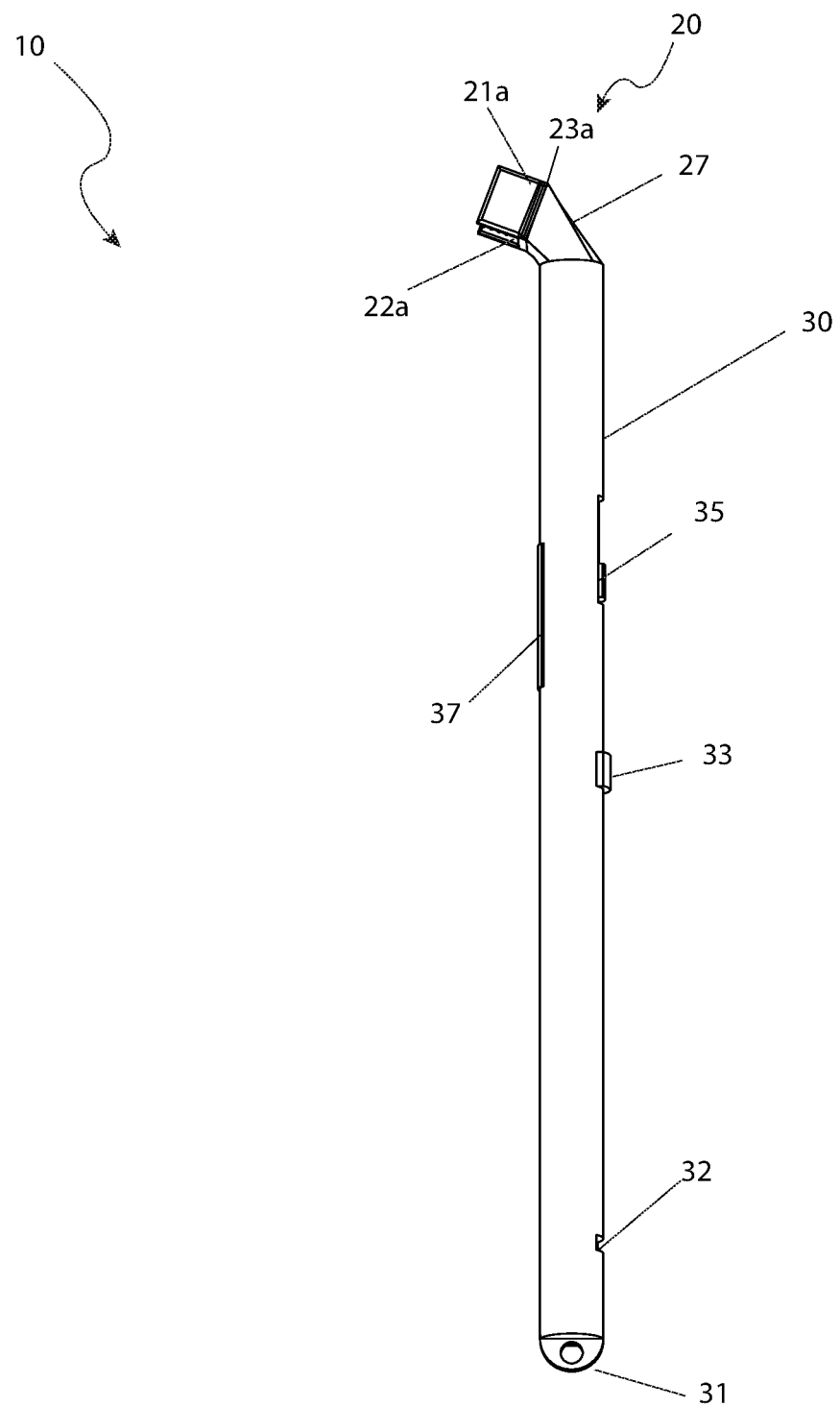
FIG. 1 is a side perspective view of the toothbrush 10, according to the preferred embodiment of the present invention.

10 toothbrush
20 head 21a first side
21b first side bristles
22a second side
22b second side bristles
23a first side flexible element
23b second side flexible element
24 center portion
25 center brush
27 neck
30 handle
31 hanging aperture
32 charger port
33 indicator light
35 power switch
37 battery compartment door
50 first motor
55 reciprocating wheel
60 pivot bushing
65 first lock block
70 first Bowden cable
75 second Bowden cable
80 second lock block
85 reciprocating travel path "1"
90 second motor
95 third Bowden cable
100 motor power leads
105 battery charge control circuit
110 motor control circuit
115 rechargeable battery 1. Description of the Invention The best mode for carrying out the invention is presented in terms of its preferred embodiment, herein depicted within FIG. 1. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

Figure 2:
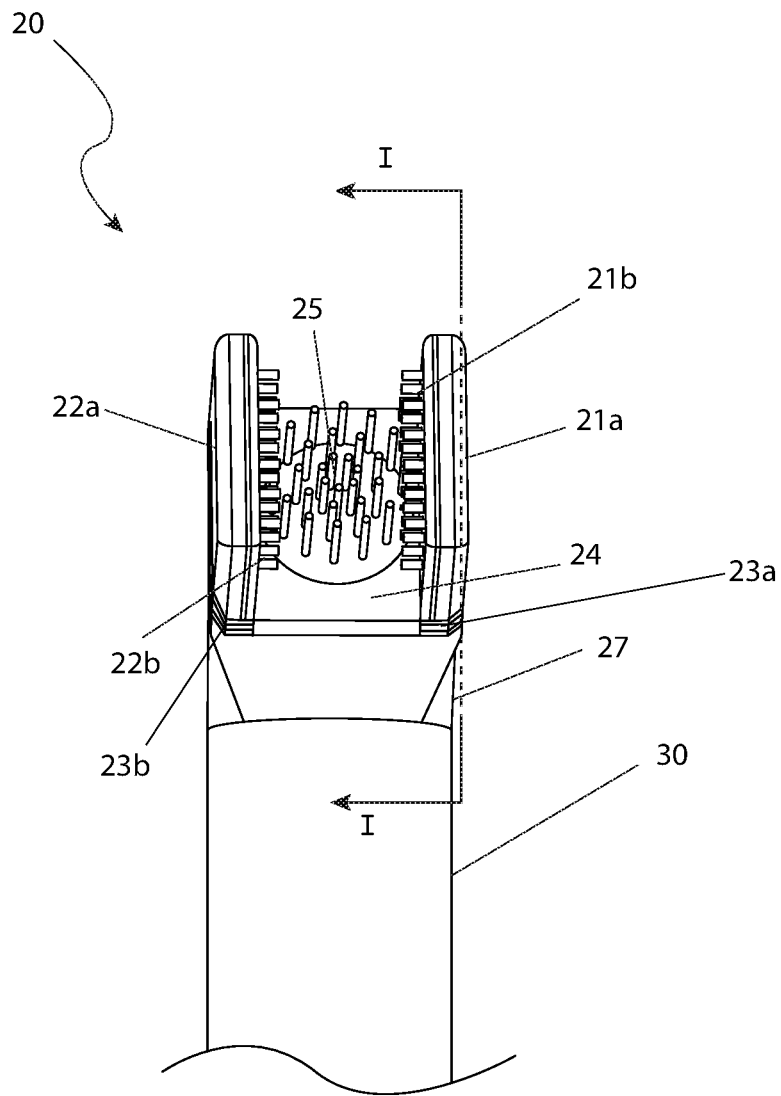
FIG. 2 is a close-up view of the head portion 20 of the toothbrush 10, according to the preferred embodiment of the present invention.

FIG. 1 illustrates a side perspective of the toothbrush 10, whereas FIG. 2 illustrates a close-up view of the head 20 of the toothbrush 10. It is appreciated that the toothbrush 20 is power by electricity, typically supplied by an onboard set of batteries and motioning a center brush 25 independently from a first side 21a and a second side 22a. Preferably, the center brush 25 rotates in a radial direction and the first side 21a and the second side 22a is motioned in a linear direction.

Looking more closely at FIG. 1, it is illustrated that the toothbrush has a head 20 and a handle 30. The handle 30 is generally linear and elongated, having a cylindrical or other shape that is hollow. The head 20 of the toothbrush 10 extends away at angle from a first distal end of the handle 30 with a neck 27. At the opposing second distal end of the handle 30 is a flattened portion with a hanging aperture 32 to enable the toothbrush 10 to be suspended form a support structure.

A battery compartment door 37 is located on a side of the handle 30 approximately midway between the first and second distal ends. The battery compartment door 37 removably covers a battery compartment that is configured to hold at least one (1) battery therein. The batteries, when installed, provide an electrical connection to a motors 50, 90 (not shown) within the handle 30. A first motor 50 is in mechanical communication to drive both the first side 21a and second side 22a simultaneously. A second motor 90 is in mechanical communication to drive the center brush 25. A power switch 35 is located on the side of the handle 30 and selectively provides or ceases power from the battery to the motor. An indicator light 33 is provided also on the side of the handle 30 to provide illumination that indicates relative power of the battery, and/or activation of the motor. It is appreciated that activation of the power switch 35 activates the motors 50, 90 to drive either the center brush 25 or the first and second sides 21a, 22a. Other embodiments provide that both the first motor 50 and second motor 90 can be activated upon a single activation of the power switch 35, or subsequent activations can operate different sequences of the drive mechanisms. One (1) such exemplary embodiment can have a first activation of the power switch 35 activate the second motor 90 to motion the center brush 25 only, a second activation of the power switch 35 can activate the first motor 50 to motion the first side 21a and second side 22a simultaneously only, and a third activation of the power switch 35 can activated both motors 50, 90 simultaneously to motion the first side 21a, second side 22a, and center brush 25 simultaneously.

Referring now to FIG. 2, a close-up view of the head 20. The head 20 can be an extension of the neck 27, which in turn can be an extension of the handle 30. The head 20 has a center portion 24, a first side 21a and a second side 22a. The center portion 24 is generally square in cross-sectional shape and has a center brush 25 extending perpendicularly away therefrom. The center brush 25 is fashioned as a plurality of bristles arranged in a circular pattern. The center brush 25 is operably attached to the first drive mechanism within the head 20.

The first side 21a extends away from a first side of the center portion 24 in the same direction as the plurality of bristles that make up the center brush 25. The second side 22a extends away from a second side of the center portion 24 in the same direction as the plurality of bristles that make up the center brush 25. The first side 21a and second side 22a therefor bracket the center brush 25. The first side 21a and second side 22a each terminates at a greater distance than the center brush 25 and are essentially mirror images of each other. Extending perpendicularly away from an inner surface of the first side 21a is a plurality of first side bristles 21b. Similarly, extending perpendicularly away from an inner surface of the second side 22a is a plurality of second side bristles 22b. The first side bristles 21b and second side bristles 22b therefor extend towards the center brush 25. In certain embodiments, a first side flexible element 23a is located between the first side of the center portion 24 and the first side 21a. Similarly, a second side flexible element 23b is located between the second side of the center portion 24 and the second side 22a. The flexible elements 23a, 23b may be coextensive with the widths of the respective sides 21a, 22b, or a portion thereof. These flexible elements 23a, 23b enable a more customized brushing action to aid in motioning the side bristles 21b, 22b to more beneficially conform to the contours of the teeth of the user.

Figure 3:
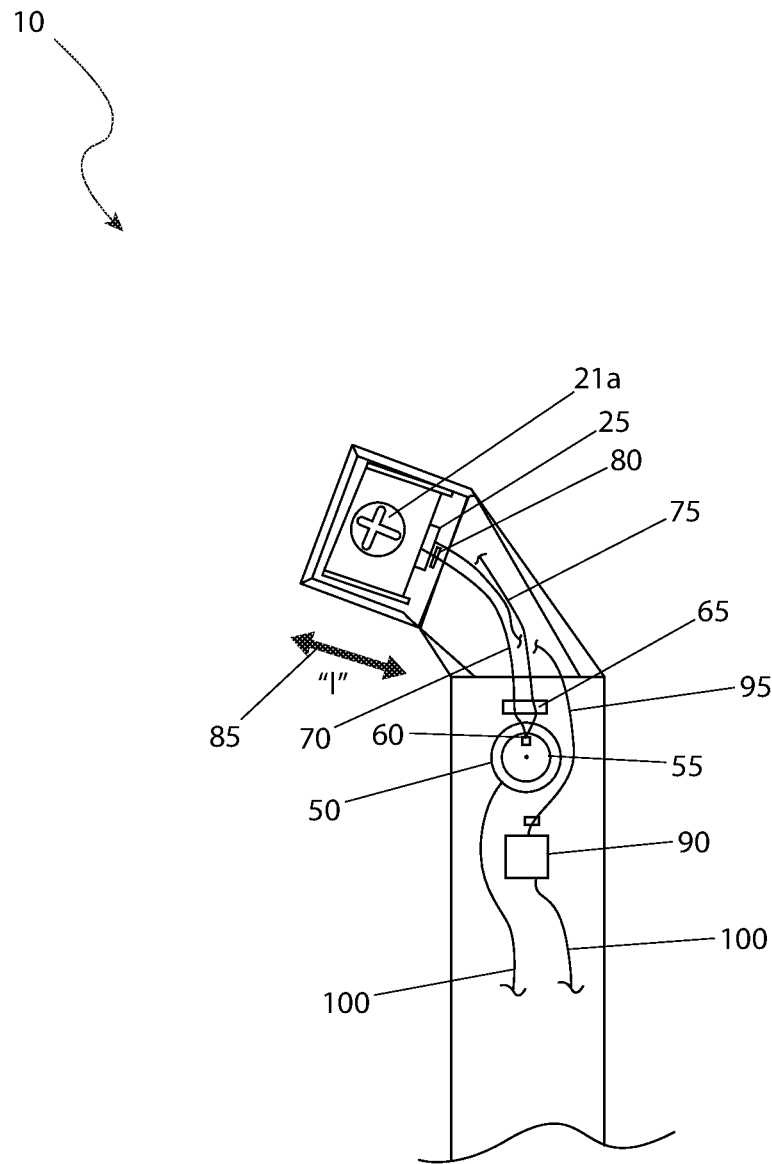
FIG. 3 is a sectional view of the toothbrush 10, as seen along a line I-I, as shown in FIG. 1, according to the preferred embodiment of the present invention, and, FIG. 4 is an electrical block diagram depicting the major electrical components of the toothbrush 10, according to the preferred embodiment of the present invention.

Referring next to FIG. 3, a sectional view of the toothbrush 10, as seen along a line I-I, as shown in FIGURE, 1, according to the preferred embodiment of the present invention is shown. A first motor 50 drives a reciprocating wheel with a pivot bushing 60. A first lock block 65 provides attachment for a first Bowden cable 70 and a second Bowden cable 75. The reciprocating action of the reciprocating wheel 55 is then transmitted along the first Bowden cable 70 where a second lock block 80 allows for movement of the first side 21a along a reciprocating travel path "1" 85. Likewise, the second Bowden cable 75, provides for reciprocating action to the second side 22a (not shown due to illustrative limitations). A second motor 90 drives a third Bowden cable 95 along a rotational path. This rotational path is then transmitted to the center brush 25. Motor power leads are electrically connected to the balance of the electrical circuitry as will be shown herein below. The Bowden cables 70, 75, 95 can pass through the interior of the neck 27 and head 20. Both the first side 22a and second side 22a are operably attached to the first and second Bowden cables 70, 75 within the head 20.

It is appreciated that the first motor 50 simultaneously drives the first side 21a and second side 22a in a linear direction (i.e. in an up-and-down direction). Therefore, the first side 21a and second side 22a is linearly movable relative to the center portion 24. In a preferred method of use, the head 20 is sized such that the gap produced between the first side 21a, second side 22a, and center portion 24 is large enough the accommodate at least a portion of a tooth of a user, and more preferably, the front of the tooth reaching up to and partially extending to the gum, the rear of the tooth reaching up to and partially extending to the gum, and the opposing end of the tooth opposite the gum. When the motors 50, 90 operate the first side 21a, second side 22a, and center brush 25, all areas of the tooth can be cleaned.

Figure 4:
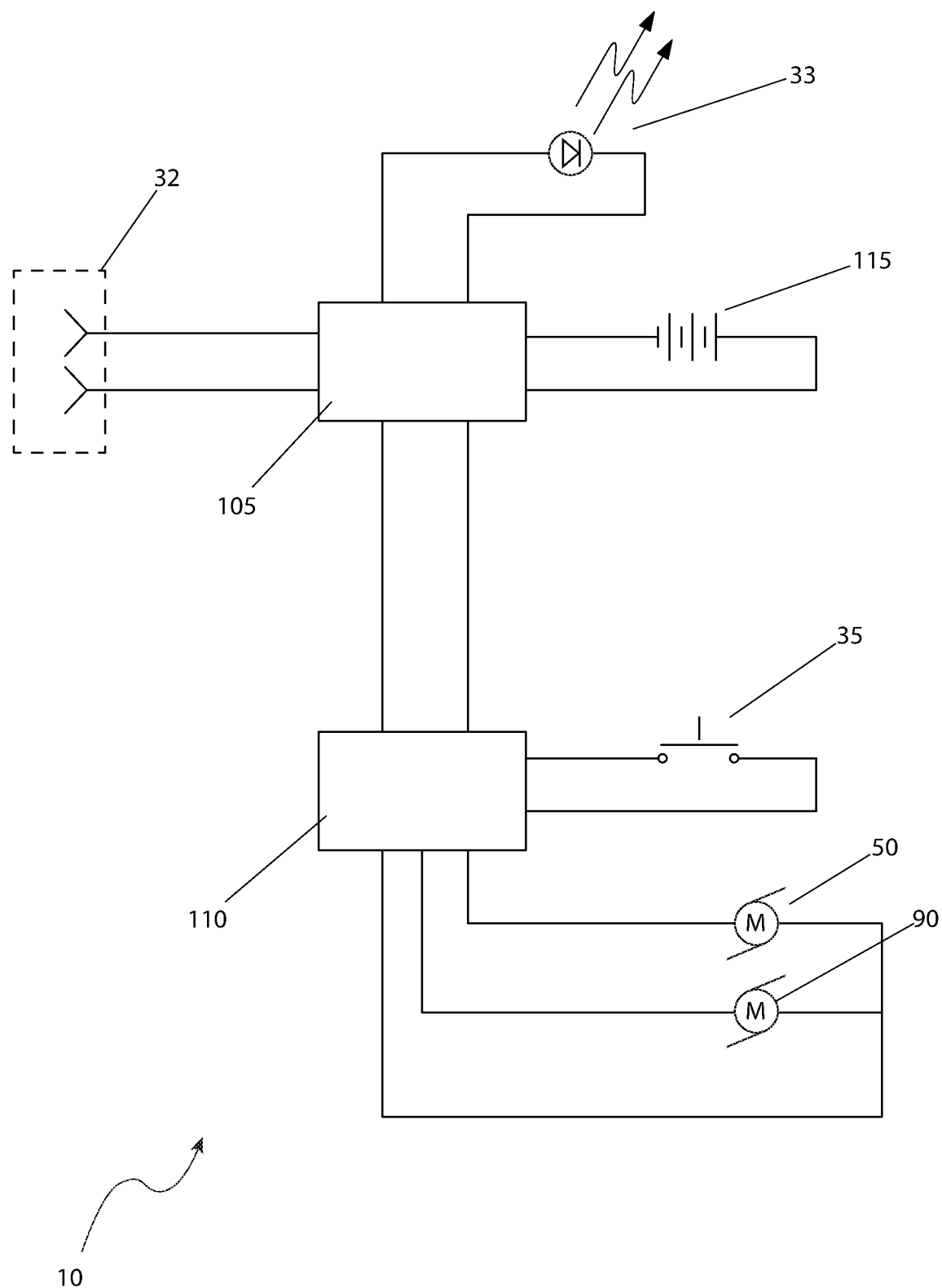

FIG. 4 is an electrical block diagram depicting the major electrical components of the toothbrush 10, according to the preferred embodiment of the present invention. The charger port 32 provides electrical power to a battery charge control circuit 105. In turn, the battery charge control circuit 105, provides electrical power to a motor control circuit 110 and the indicator light 33 to provide visual indication on the charge level of the rechargeable battery 115. The motor control circuit 110 then receives input from the power switch 35. As aforementioned described, the operating mode of the motor control circuit 110 allows for activation of the first motor 50, the second motor 90, or both the first motor 50 and the second motor 90 simultaneously. A fourth activation of the power switch 35 powers off the toothbrush 10 in a cyclical repeating fashion.

It can be appreciated that any of the first side bristles 21b, second side bristles 22b, or center brush 25 comprise hard, medium or soft bristles, or be in any specific pattern that still enables the proper cleaning of the teeth in the manner described herein. The material soft toothbrush 20 are preferably waterproof and resilient and easily cleaned. It is also appreciated that the toothbrush 10 can still function as a cleaning instrument without the use of the power. It is preferred that the side bristles 21b, 22b have a length smaller than the length of the bristles of the center brush 25.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A toothbrush comprising:
   a head having a center portion, a first side with a first flexible element, and a second side with a second flexible element;
   a generally linear elongated handle having a first distal end and a second distal end, the head extends away at an angle from the first distal end of the handle with a neck;
   a center brush having a plurality of bristles arranged in a circular pattern, the center brush is operably attached to a first drive mechanism within the head;
   a battery compartment door located on a side of the handle midway between the first distal end and the second distal end;
   a first motor in mechanical communication to drive both the first side and the second side simultaneously;
   a second motor in mechanical communication to drive the center brush;
   a power switch located on the side of the handle and selectively provides or ceases power from at least one battery to the motors;
   an indicator light provided also on the side of the handle to provide illumination that indicates power of the at least one battery, and/or activation of the first and second motors;
   the first motor driving a reciprocating wheel with a pivot bushing;
   a first lock block providing attachment for a first Bowden cable and a second Bowden cable, the Bowden cables pass through an interior of the neck and the head and the first side and the second side are operably attached to the first and second Bowden cables within the head; and
   the second motor driving a third Bowden cable along a rotational path that is transmitted to the center brush.

2. The toothbrush according to claim 1, wherein the center portion is generally square in cross-sectional shape.

3. The toothbrush according to claim 1, wherein the center brush extends perpendicularly away therefrom the center portion.

4. The toothbrush according to claim 1, wherein the first side and the second side each terminates at a greater distance than the center brush and are mirror images of each other.

5. The toothbrush according to claim 1, further comprising extending perpendicularly away from an inner surface of the first side is a plurality of first side bristles.

6. The toothbrush according to claim 1, further comprising extending perpendicularly away from an inner surface of the second side is a plurality of second side bristles.

7. The toothbrush according to claim 1, wherein the generally linear elongated handle is cylindrical.

8. The toothbrush according to claim 1, wherein the generally linear elongated handle is hollow.

9. The toothbrush according to claim 1, wherein the second distal end of the handle is a flattened portion with a hanging aperture to enable the toothbrush to be suspended from a support structure.

10. The toothbrush according to claim 1, wherein the center brush is motioned from the first side and the second side in a linear direction.

11. The toothbrush according to claim 1, wherein the center brush rotates in a rotational path.

12. The toothbrush according to claim 1, wherein the center brush is electrically powered by the at least one battery.

13. The toothbrush according to claim 1, wherein the battery compartment door removably covers a battery compartment that is configured to hold at least one battery therein.

14. The toothbrush according to claim 1, wherein the power switch activates the motors to drive the center brush.

15. The toothbrush according to claim 1, wherein the power switch activates the motors to drive the first side or the second side.

16. The toothbrush according to claim 1, wherein the power switch includes a first activation mode of the power switch to activate the second motor to motion the center brush.

17. The toothbrush according to claim 1, wherein the power switch includes a second activation mode of the power switch to activate the first motor to motion the first side and the second side simultaneously.

18. The toothbrush according to claim 1, wherein a reciprocating action of the reciprocating wheel is transmitted along the first Bowden cable where a second lock block allows for movement of the first side along a reciprocating travel path and the second Bowden cable provides for reciprocating action to the second side.

19. The toothbrush according to claim 1, wherein the head is sized such that a gap produced between the first side, the second side, and the center portion is large enough to accommodate at least a portion of a tooth of a user.

20. The toothbrush according to claim 19, wherein the motors operate the first side, the second side, and the center brush cleaning all areas of the tooth of the user.

* * * * *